Dec. 11, 1945.    M. WATTER    2,390,761
AIRCRAFT STRUCTURE
Filed June 16, 1943    2 Sheets-Sheet 1
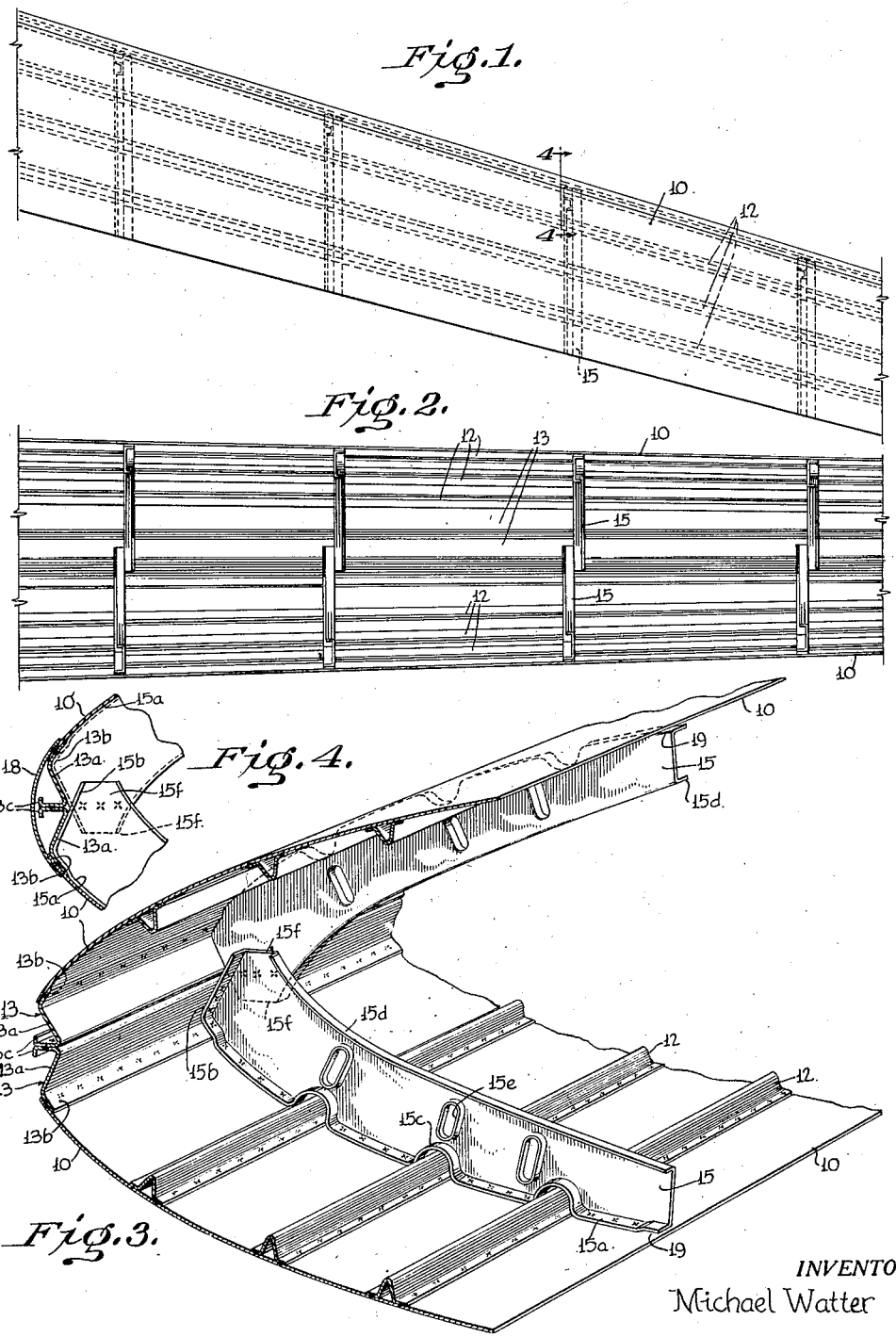
INVENTOR
Michael Watter
BY John P. Tarbox
ATTORNEY Dec. 11, 1945.                M. WATTER                    2,390,761
                           AIRCRAFT STRUCTURE
                        Filed June 16, 1943          2 Sheets-Sheet 2
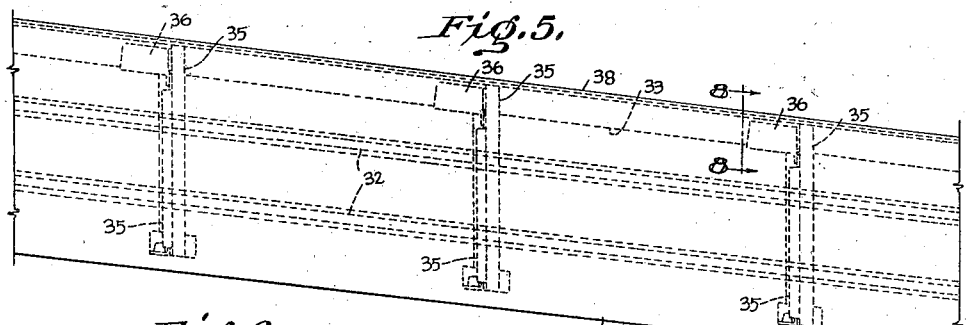
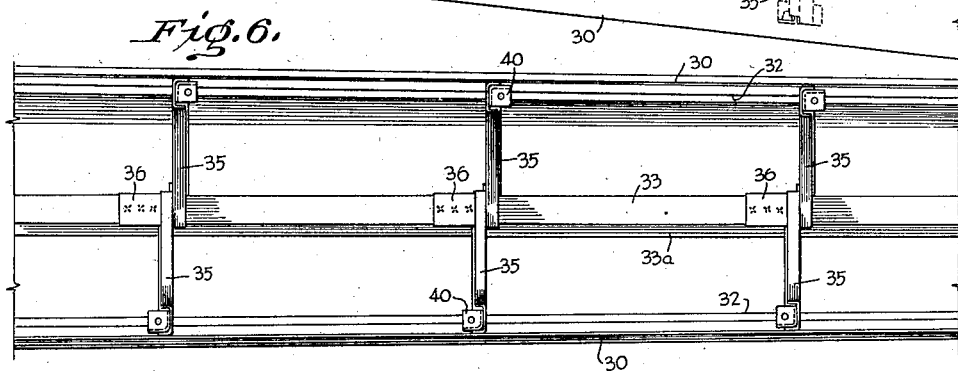
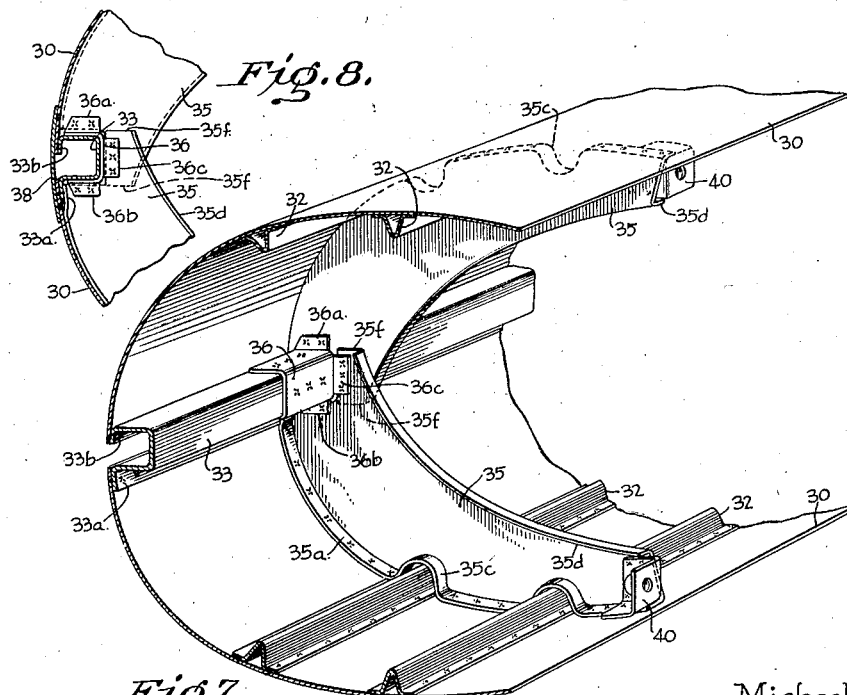
INVENTOR
Michael Watter
BY John P. Tarbox
ATTORNEY Patented Dec. 11, 1945

2,390,761

UNITED STATES PATENT OFFICE 2,390,761

AIRCRAFT STRUCTURE

Michael Watter, Philadelphia, Pa., assignor to Edward G. Budd Manufacturing Company, Philadelphia, Pa., a corporation of Pennsylvania Application June 16, 1943, Serial No. 491,035

7 Claims. (Cl. 244—124)

This invention relates to airfoils and the like, particularly to nose or leading edge sub-assemblies for such structures.

In the fabrication of airfoils from sheet metal, such for example as cold-rolled stainless steel, it is very desirable and economical to prepare sub-assemblies, which include portions of a metallic skin backed by suitable stiffeners, and to unite these sub-assemblies into a final assembly or to form larger sub-assemblies suitable for later forming unit groups. In this way the manufacturing operations may be widely divided among the greatest number of workers to secure the greatest speed of manufacture and the most favorable inspection methods. Moreover, replacement or repair of damaged sections is greatly facilitated.

The primary aim of the present invention is the provision of a nose sub-assembly for airfoils and the like which is capable of easy and economical assembly in quantity production and in which the parts thereof which provide for such assembly also provide an improved construction of increased strength, particularly torsional rigidity.

The invention is illustrated in connection with an airfoil for aircraft, as for example the leading edge or nose section of a wing, stabilizer, or fin, or a movable member such as an aileron, elevator or rudder.

Other objects and advantages of the invention will be apparent from the following description of certain exemplary embodiments shown in the accompanying drawings, wherein:

Fig. 1 is a side elevation of the nose section of an airfoil, such as a tail fin of an airplane, embodying the invention;

Fig. 2 is an inside elevation looking upward from below in Fig. 1;

Fig. 3 is an enlarged end perspective view of Fig. 2;

Fig. 4 is a partial chordwise section taken near the leading edge of Fig. 3, the view being an enlarged section on the line 4—4 of Fig. 1;

Fig. 5 is a top plan view similar to Fig. 1 but showing a modification in an aileron leading edge section;

Fig. 6 is an inside elevation looking upward from below in Fig. 5;

Fig. 7 is an enlarged end perspective view of Fig. 6; and

Fig. 8 is a partial chordwise section taken near the leading edge of Fig. 7, the view being an enlarged section on the line 8—8 of Fig. 5.

Referring first to the embodiment shown in Figs. 1 to 4, the airfoil nose section is adapted to be assembled as a complete leading edge or nose sub-assembly through the provision of the two half units joined to each other and in condition to be connected at the trailing end to a section of an airfoil or, as two half units, which are assembled with the halves of a second airfoil section where the second section is assembled from substantially complete half units into a final assembly.

Here, the metallic skin sheet 10 for each blanket has secured to its inside surface, as by spot welding, stiffening stringers 12 of suitable cross sectional shape. The skin sheets and stiffening stringers together are often designated as skin blankets. At the leading edge of each blanket a heavier stringer 13 of generally Z-shaped cross section is secured to the inner surface thereof as by spot welding, the stringer 13 having a deep web 13a, a flat flange 13b, and a forwardly extending flanged flange 13c, the flange 13b being welded to the skin sheet.

Spaced interior rib chord elements 15 of channel section are provided for each skin blanket and these are welded through their outer flanges 15a to the skin sheet and through their front end flanges 15b to the heavy front stringer 13. The web and outer flanges 15a of the rib chord elements 15 are provided with recesses or notches 15c to span the stringers 12 which are through-running. They also may be provided with interior stiffening flanges 15d and web stiffening beads 15e in the regions of the recesses 15c.

At their leading ends the rib elements 15 of the two blankets are provided with projections 15f which extend beyond the median plane of the nose assembly, the flanges 15a, 15b, and 15d of the rib chord elements being oppositely disposed and the flat faces of these projections fitting against each other, as shown in Fig. 3, so that when the half units are assembled together these overlapping projections can be spot welded together.

The meeting forwardly extending flanges 13c are also secured together as by spot welding. A bow sheet or nose skin cover sheet 18 may be secured over the gap as by welding or by screws to complete the smooth rounded contour of the nose section.

The trailing ends of the rib chord elements 15 may be provided with joggles 19 in the outer flanges 15a to receive the front edges of adjacent skin sheets when the leading section, in whole or in halves, is connected to a second section of an airfoil to complete the airfoil assembly. The later views show one means for connecting fore and aft sections. There are other ways, as for example by welding adjacent rib chord elements together, either directly or through splicers, clips, or the like. In some instances, particularly when the skin sheets themselves are of sufficient gauge, rather than providing a separate stringer for each skin sheet, the leading edge of the skin sheet may itself be formed to shape corresponding to that of the stringer 13.

The modification shown in Figs. 5 to 8 is similar in many respects to that of Figs. 1 to 4 but is particularly adapted to form the leading section of a movable airfoil, such as a wing aileron, and includes a pair of ribbed skin blankets and a connecting stringer at the leading edge.

The skin sheets 30 are each provided with stringers 32 to form a skin blanket and one of the blankets is provided with a heavy through-running outwardly open channel or box-section stringer 33 which includes an outwardly turned flange 33a and an inwardly turned flange 33b. The flange 33a is welded to the bottom skin sheet, as viewed in Fig. 7, and the flange 33b is welded to the other skin sheet to form the subassembly unit. The flange 33b is exposed outwardly, as will be later described, to insure easy access for welding. The space within the open box section thus provided at the leading edge may be used to house counterbalance weights, and the same is true of the first-described form.

Interiorly, rib chord elements 35 are welded through their outer flanges 35a to each skin sheet 30 and their webs are welded to lateral tabs 36a, 36b, 36c, formed on a channel or box-shaped clip 36 which embraces and is welded to the heavy nose stringer 33. The rib chord elements 35 are provided with recesses or notches 35c to span the stringers 32. They are also provided with interior stiffening flanges 35d. At their leading ends the rib elements 35 are provided with projections 35f which extend beyond the median plane of the airfoil and these projections are welded to each other and to a tab 36c of the clip 36 when the forward half units are assembled together. A bow sheet or nose skin cover sheet 38 may be secured over the nose gap as by welding or by screws, depending on the detail method of assembly; or, if desired, the channel space may be closed by a narrow strip of fabric adhesive material.

The nose section is provided at the rear end, as on the rib elements 35, with connecting brackets 40 for attaching a trailing section. Similar brackets may also be provided for the rib elements 15 of the construction previously described.

In the assembly of the nose section of Figs. 1 to 4 the two skin blankets are separately prefabricated in the flat, that is, the skin sheets are disposed in a flat condition and the stringers are spot welded to the skin sheet while the sheet is in this condition. By this means of fabrication the spot welding of the stringers to the skin sheet may be quickly accomplished through the use of a roller welding machine. Each of the heavy stringers 13 may also be spot welded to the leading edge of the skin sheet while the sheet is in this flat condition. After the assembly of the flat stringers 12 and 13 to the skin sheet each half-shell assembly is then completed by mounting the blanket in a suitable jig having a contour corresponding to the airfoil contour of that half of the assembly, the skin sheet being clamped into position to maintain this contour.

The half rib elements 15 then may be spot welded to the skin blankets and to the flange 13a of the heavy stringers 13 while the skin sheet is maintained in this condition.

As thus assembled, the portions 15f of the rib elements will extend beyond the flange 13c of the stringer 13. Thereafter the two half assemblies or half-shells are brought into their proper relative positions in which the portions 15f of the opposite half rib elements will overlap and the flanges 13c of the heavy stringers 13 will abut each other. While the two half assemblies are maintained in this position, the overlapping projecting portions 15f of the rib elements are spot welded together through the use of suitable welding tongs and at the same stage the abutting forwardly extending flanges 13c are spot welded together at desired intervals throughout their length. It will be noted from the showing of Fig. 3 that complete unobstructed access may be had at all times for performing these welding operations. Subsequently the streamlined contour of the nose section may be completed by providing the rounded nose strip 18, as shown in Fig. 4, which may be spot welded or otherwise secured in position.

In the assembly shown in Figs. 5 to 8 the skin sheets and the stringer 32, as in the previous case, may be assembled flat. In this particular instance the channel-shaped stringer 33 is spot welded through its flange 33a to the bottom sheet 30, as viewed in Fig. 7. Previous to the securing of the channel-shaped member 33 in position, the U-shaped clips or brackets 36 are spot welded to the stringer 33 and during the assembly of the rib elements 35 to the lower blanket, as viewed in Fig. 7, the leading ends of these rib elements are spot welded to the lateral tabs 36b and 36c of the U-shaped bracket. The final step in the assembly of this structure is that of assembling with the first or lower half-shell the upper half-shell, as viewed in Fig. 7, during which operation the leading edge of the upper blanket skin is overlapped with the flange 33b of the stringer 33 and the rib elements 35 are overlapped with the corresponding rib elements of the lower half-shell and the tabs 36a, at which time the projecting portions 35f are spot welded together through the bracket tabs 36c, the upper rib elements are spot welded to the tabs 36a, and the overlapping skin sheet and flange 33b are spot welded together. Here again complete access is had at all times to permit easy accomplishment of the welding operation.

It is thus seen that the invention provides an improved combination of parts which can be easily assembled as part units and then later assembled as complete sub-units. The rib elements fit together and may be easily reached from the rear by welding devices and the front edges of the halves are accessible for welding devices on the outside, after which the space is closed by a skin filler sheet.

In addition to providing a nose asssembly which is capable of rapid and simple fabrication, the structural features described provide for improved strength and torsional rigidity at the leading edge of the structure. This increased strength and torsional rigidity are brought about in the main by the stringers 13 in the first construction described and by the stringer 33 in the second construction. In the first construction, in particular, the generally Z-shaped stringers 13 through the secure abutting flanges 13c and the obtuse angle relationship of their flanges 13a afford an efficient rigid strength-giving leading edge portion which greatly enhances the strength of the structure as a whole.

It is to be understood that in lieu of spot welding the various parts together the same may be secured by riveted connections.

While specific embodiments of the invention have been described by way of example it is to be understood that the invention may have various embodiments within the limits of the prior art and the scope of the subjoined claims.

What is claimed is:

1. In an airfoil nose section assembly, in combination, paired rib elements provided with overlapping projections at the front end through which to be connected together and being spaced apart at other places, said rib elements having flanges along the outer edge and on the front end, said flanges being disposed in opposite directions from the facing plane between the rib elements, a skin sheet secured to the outer flange of each rib element, and a transverse stringer secured to the front flange of each rib element, said stringers having forwardly extending flanges outside the assembly adapted to overlap each other and to be connected together from the outside of the nose assembly, said rib element projections and said stringer flanges being connected together in the final assembly.

2. In an airfoil nose section assembly, in combination, mating rib-and-skin subassemblies including paired rib elements provided with overlapping projections at one end through which to be connected together and being spaced apart at other places, at least one of said rib elements having flanges along the outer edge, said flanges being disposed on opposite sides of the meeting plane between the rib elements, a skin sheet secured to the outer flange of each rib element, and a transverse stringer element secured to the connected end of one of said rib elements, said stringer having a flange accessible from the front outside of the assembly, a mating transverse element carried by the opposite rib-and-skin subassembly which overlaps and is adapted to be secured to the first mentioned transverse stringer flange in the final assembly and from the outside of the rib-connected end of the assembly, said rib element projections also being secured together in the final assembly by securing means aligned with the front stringer.

3. In an airfoil nose section assembly, in combination, paired rib elements provided with overlapping end projections through which to be connected together and an outer edge to which a skin sheet is attached, said rib elements having flanges along the outer edge, said flanges being disposed on opposite sides of the meeting plane between the rib elements, a skin sheet secured to the outer flange of each rib element, a channel-shaped transverse stringer having flanges on its sides, one outside and one inside the channel extending in the same direction, the outer flange being secured to one skin sheet before final assembly, and a channel-shaped clip embracing and secured to said stringer and having end flanges secured to said rib element projections, said rib element projections being secured together in final assembly, the other skin sheet and the exposed flange in the channel of said stringer also being secured together in final assembly.

4. In an airfoil nose section assembly, in combination, paired flanged rib elements having oppositely directed flanges and side-overlapping connection projections, said rib elements being notched on the sides and on the front ends to receive transverse skin blanket stringers, a skin blanket including skin sheets and transverse stringers secured to each rib element, the front stringer being channel-shaped with a flange on each side, both flanges being turned in a common direction, the outer flange being connected to one skin sheet before final assembly and the inner flange which is exposed at the front being connected to the other skin sheet in final assembly, and a channel-shaped clip fitting over and secured to said channel-shaped stringer and having end flanges secured to the overlapping portions of the rib extensions when these are secured together in final assembly.

5. A nose assembly for airfoils and the like comprising two mating half-shells each including rib elements and coverings thereon, the rib elements overlapping in transverse planes which are perpendicular to the front edge of the airfoil and being secured together inside the assembly by shear means, the rear end of the assembly being open to permit making the rib connections, the front ends of the rib elements being depressed from their most forward portions at the overlap to form together an intermediate front recess, and transverse elements comprising part of said coverings secured to said rib elements within their recesses.

6. A nose assembly for airfoils and the like comprising two mating half-shells each including rib elements and coverings thereon, the coverings comprising skin sheets and stringers, the rib elements overlapping in transverse planes which are perpendicular to the front edge of the airfoil and being secured together inside the assembly by shear means, the rear end of the assembly being open to permit making the rib connections, the front ends of the rib elements being depressed from their most forward portions at the overlap to form together an intermediate front recess, and a recessed stringer element secured in the rib recesses, the stringer element comprising part of the joint means between the coverings of the mating half-shells and the joint means being disposed substantially within the recess of the stringer element but accessible from the outside of the assembly.

7. An assembly as set forth in claim 6 which further comprises a closing skin sheet secured over and supported by forwardly extending portions of said stringer element.

MICHAEL WATTER.